M. C. BULLOCK.
Conical-Roller Thrust-Bearing.
No. 165,538. Patented July 13, 1875.
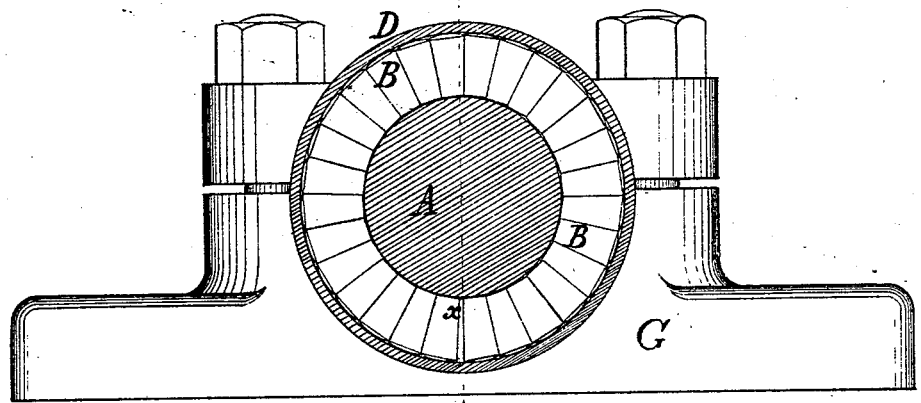
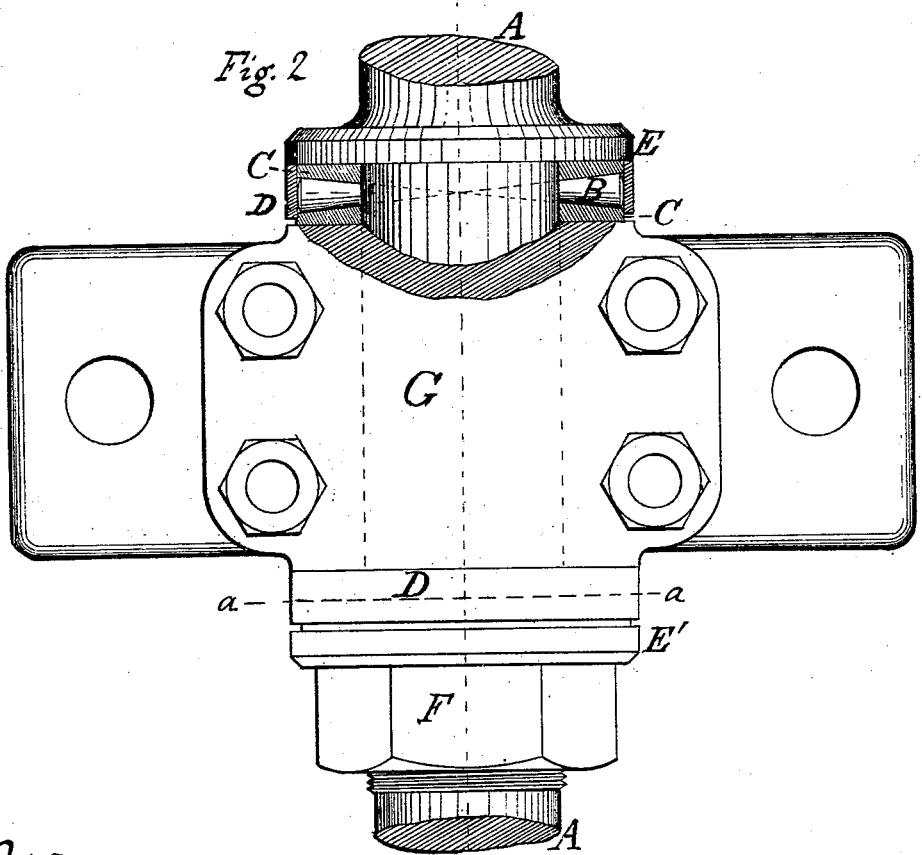

UNITED STATES PATENT OFFICE.

MILAN C. BULLOCK, OF NEW YORK, N. Y.

IMPROVEMENT IN CONICAL-ROLLER THRUST-BEARINGS.

Specification forming part of Letters Patent No. 165,538, dated July 13, 1875; application filed May 29, 1874.

*To all whom it may concern:*

Be it known that I, MILAN C. BULLOCK, of the city, county, and State of New York, have invented a new and useful Conical-Roller Thrust-Bearing; and I do hereby declare the following to be a full, clear, and exact description thereof, which will enable others skilled in the art to which it appertains to make and use the said invention, reference being had to the accompanying drawing.

The object of this invention is to relieve the friction produced by the end thrust of revolving shafts or collars thereon upon their fixed supports or bearings; and it consists in the combination, with a series of conical rollers, of two disks, whose inner faces fit the sides of said rollers, and of a ring, whereby they are retained in position, all constructed and arranged as hereinafter described. It is applicable to machinery of various kinds, and in this specification I exhibit it as applied to the main shaft of a screw-propeller engine on a steamship.

In the accompanying drawing, which forms a part of this specification, Figure 1 is an end or front elevation of a pillow-block, supporting a shaft provided with my roller thrust-bearing, the front disk being removed, so as to show a transverse section of the shaft and retaining-ring, taken on the line $a\ a$, Fig. 2; and Fig. 2 is a plan of the same, with a portion of the pillow-block and roller-bearing broken away, so as to show a side view of the rollers, and a horizontal section of the disks and retaining-ring.

The same parts are denoted by the same letters in both the figures.

A in the drawing represents the shaft, on which are two collars, E and E'. The collar E is welded or shrunk on in the usual manner, while E' is bored out to a sliding fit, and placed on the shaft, as hereinafter described. G is the pillow-block, which supports the shaft and receives its thrust in either direction. B B are a series of conical rollers, inclosed between a retaining-ring, D, and annular plates or disks C C. The rollers, ring, and disks are all made of steel, hardened and finished, after tempering, by grinding. The rollers and disks are so constructed that each diametrically-opposite pair of rollers form frustums of the two nappes of a cone, as shown in Fig. 2, where the upper line (with reference to the top of the sheet) of one roller forms the lower line of the opposite one, and the upper line of the latter is the lower line of the former. The outer ends or bases of the conical rollers are spherical surfaces, whose radius is much less than that of ring D, so that only a small part of each roller is in contact with the ring, and that at the center of the end, where there is least motion, thus reducing the friction and wear of the parts.

The form of the disks C C is shown in section in Fig. 2. Their inclined faces, on which the rollers travel, are made on the same bevel as the rollers, so that the rotation of either of the plates C C, produced by a thrust from the adjacent revolving part, causes the rollers to revolve around the center of said plates with a true rolling motion, and without slipping or sliding. The backs or outer faces of the disks are shaped to fit the surfaces with which they are in contact.

The diameter of the ring D is such that it keeps the rollers in the relative position above described while they do their work. This ring may be wide enough to cover the rollers either entirely or only partially, in which latter case their action can be seen while running; and to allow for wear, it should be a little narrower than the combined thickness of the disks and rollers when in position, as shown in Fig. 2. The ring D and disks C C are not secured to anything, but are free to rotate on the rollers, so that should one of the rollers be broken, it would catch and carry the disk round, thereby preventing injury to the others.

Two sets of disks, rollers, and retaining-rings are used with the propeller-shaft, one on each side of the pillow-block, to receive the thrust from the end of the shaft, whichever way the screw revolves, one disk of each set bearing against the pillow-block, and the other against the collar E or E'. After they have been placed in position on the shaft, the collar E' is slipped over the threaded end thereof, (the end next the bottom of the sheet in Fig. 2,) and keyed or feathered to the shaft to prevent its turning. The nut F is used to secure the collar E' in position, and also to assist in transferring the thrust from the threaded end of the shaft to the adjacent roller-bearing and the pillow-block. More than one nut may, if necessary, be used for this purpose.

In Fig. 1 the rollers are shown as nearly filling the ring D, except a little clearance space at $x$, which space, when the rollers are at work, will be divided equally among them all.

What I claim as my invention, and desire to secure by Letters Patent of the United States, is—

The combination, with the disks C C and retaining-ring D, of the conical rollers B B, constructed without journals, and whose outer bases are spherical surfaces of less radius than that of the retaining-ring.

MILAN C. BULLOCK.

Witnesses:
JAMES N. WELLS,
W. J. WELLS.